United States Patent
Yano (10) Patent No.: US 11,044,334 B2
(45) Date of Patent: Jun. 22, 2021

(54) TERMINAL DEVICE, CONTROL METHOD, AND STORAGE MEDIUM

(71) Applicant: CANON KABUSHIKI KAISHA, Tokyo (JP)

(72) Inventor: Masaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 16/556,075

(22) Filed: Aug. 29, 2019

(65) Prior Publication Data
US 2020/0092386 A1 Mar. 19, 2020

(30) Foreign Application Priority Data

Sep. 13, 2018 (JP) .............................. JP2018-171480

(51) Int. Cl.
*H04L 29/08* (2006.01)

(52) U.S. Cl.
CPC .............. *H04L 67/26* (2013.01); *H04L 67/34* (2013.01)

(58) Field of Classification Search
CPC ................................ H04L 67/26; H04L 67/34
See application file for complete search history.

(56) References Cited

U.S. PATENT DOCUMENTS

| | | | | |
|---|---|---|---|---|
| 10,754,518 | B1* | 8/2020 | Bell | H04M 1/72484 |
| 2012/0276880 | A1* | 11/2012 | Angorn | G06F 40/106 |
| | | | | 455/414.1 |
| 2015/0371366 | A1* | 12/2015 | Hilt | G06T 3/4038 |
| | | | | 382/284 |
| 2016/0110754 | A1* | 4/2016 | Miyazaki | G06Q 30/0239 |
| | | | | 705/14.39 |
| 2016/0139761 | A1* | 5/2016 | Grosz | G06F 3/0482 |
| | | | | 715/769 |
| 2018/0032997 | A1* | 2/2018 | Gordon | G06Q 30/0269 |

FOREIGN PATENT DOCUMENTS

JP 2017-134628 A 8/2017

* cited by examiner

*Primary Examiner* — Philip J Chea
*Assistant Examiner* — Hassan A Khan
(74) *Attorney, Agent, or Firm* — Canon U.S.A., Inc. IP Division

(57) ABSTRACT

A controlling method is provided in which, in a case where a first program is installed in a terminal device by first installation processing, predetermined notification regarding the first program is executed, and, in a case where the first program is installed in the terminal device by second installation processing, the predetermined notification is not executed.

20 Claims, 10 Drawing Sheets

| No. | NOTIFICATION MESSAGE | NOTIFICATION START DATE AND TIME | NOTIFICATION END DATE AND TIME | INSTALLATION METHOD | STARTING STATE | NOTIFICATION TIMING (M) | NOTIFICATION TIMING (N) | PRIORITY | AB TEST FLAG |
|---|---|---|---|---|---|---|---|---|---|
| | | 902 | 903 | 904 | 905 | 906 | 907 | 908 | 909 |
| 1 | WE ARE CURRENTLY RUNNING A CAMPAIGN! *** YEN ONLY FOR THE FIRST TIME! | 2018-01-01T00:00:00 +0900 | 2048-01-01T23:59:59 +0900 | 3 | FALSE | 24 | 15 | 2 | FALSE |
| 2 | YOU CAN FIND VALUABLE CAMPAIGN INFORMATION. | 2018-09-01T00:00:00 +0900 | 2018-09-30T23:59:59 +0900 | 3 | FALSE | 24 | 15 | 3 | FALSE |
| 3 | APPLICATION IS INSTALLED. WHY DON'T YOU TRY OUT APPLICATION? APPLICATION IS INSTALLED. WON'T YOU TRY IT? | 2018-01-01T00:00:00 +0900 | 2048-01-01T23:59:59 +0900 | 1 | TRUE | 24 | 15 | 10 | TRUE |
| 4 | THERE IS A VALUABLE CAMPAIGN ONLY FOR A CUSTOMER HAVING A PRINTER! | 2018-01-01T00:00:00 +0900 | 2048-01-01T23:59:59 +0900 | 1 | FALSE | 24 | 15 | 1 | FALSE |
| 5 | THANK YOU FOR INSTALLATION! THERE IS A VALUABLE CAMPAIGN! | 2018-01-01T00:00:00 +0900 | 2048-01-01T23:59:59 +0900 | 2 | FALSE | 3 | 5 | 1 | FALSE |

FIG. 9B

| No. | UPLOAD STATE | NOTIFICATION TYPE | NOTIFICATION DATE | NOTIFICATION DAYS |
|---|---|---|---|---|
| | 910 | 911 | 912 | 913 |
| 1 | TRUE | 3 | | |
| 2 | FALSE | 2 | 1 | 7 |
| 3 | TRUE | 1 | | |
| 4 | FALSE | 3 | | |
| 5 | TRUE | 1 | | |

FIG.10

TERMINAL DEVICE, CONTROL METHOD, AND STORAGE MEDIUM

BACKGROUND

Field of the Disclosure

The present disclosure relates to a terminal device, a control method, and a storage medium.

Description of the Related Art

Methods used by terminal devices for displaying notification areas based on notification information are known. In Japanese Patent Application Laid-Open No. 2017-134628, there is described a mobile terminal device which receives push notification from a push notification distribution server and executes processing for informing the push notification.

The terminal device can newly install a program therein from the outside using a program such as an installer. However, depending on an installation method of a program, even if the program is installed, a user may not recognize that fact in some cases. In such a case, it is desirable that a notification is made regarding the installed program so that a user can recognize the installation of the program and be prompted to use the program.

Accordingly, there is a need to appropriately making the notification regarding the installed program.

SUMMARY

According to the present disclosure, a method for controlling a terminal device which executes first installation processing for installing a first program but not installing a second program in response to a first installation instruction received from a user and executes second installation processing for installing the first program and the second program in response to a second installation instruction received from the user includes specifying whether the first program is installed in the terminal device by the first installation processing or by the second installation processing, and not executing predetermined notification regarding the first program based on specifying that the first program is installed in the terminal device by the first installation processing and executing the predetermined notification based on specifying that the first program is installed in the terminal device by the second installation processing.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings. The exemplary embodiments which will be described below do not restrict the present disclosure according to the claims. All of combinations of features described in the exemplary embodiments are not always essential to the means for solution according to the present disclosure. Same components are denoted by the same reference numerals, and their descriptions are not repeated.

A terminal device according to a first exemplary embodiment is described. The terminal device according to the present exemplary embodiment is a device which can handle an application program (hereinbelow, referred to as an application) for a personal computer (PC), a personal digital assistant (PDA), a mobile phone, a smartphone, a digital camera, and the like. According to the present exemplary embodiment, the terminal device is a PC which can connect to the Internet by connecting to a mobile phone network and a wireless local area network (LAN) router.

<Notification System>

Figure 1:
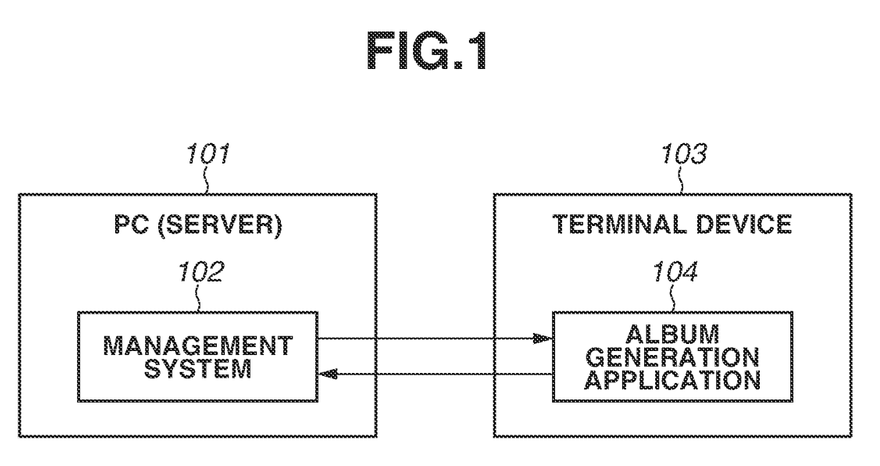
FIG. 1 illustrates an example of a configuration of a notification system.

FIG. 1 illustrates an outline of a notification system according to the present exemplary embodiment. A terminal device 103 can execute notification processing for displaying a notification message regarding an application installed in the terminal device 103 using the application. According to the present exemplary embodiment, an application for executing the notification processing is an album generation application 104 for generating and ordering a photo album. A system is described which executes the notification processing by the album generation application 104.

The terminal device 103 requests notification information from a PC 101 in response to turning on a power source of the terminal device 103 and start-up of the terminal device 103. The PC 101 is an information processing apparatus including a general PC or a server. The PC 101 includes a management system which manages information about album data being edited by a user, information about album data uploaded by the user, and information about an album ordered by the user. Upon reception of the request, the PC 101 transmits notification information stored therein to the terminal device 103. The terminal device 103 executes notification processing according to the received notification information.

<Album Ordering System>

Figure 2:
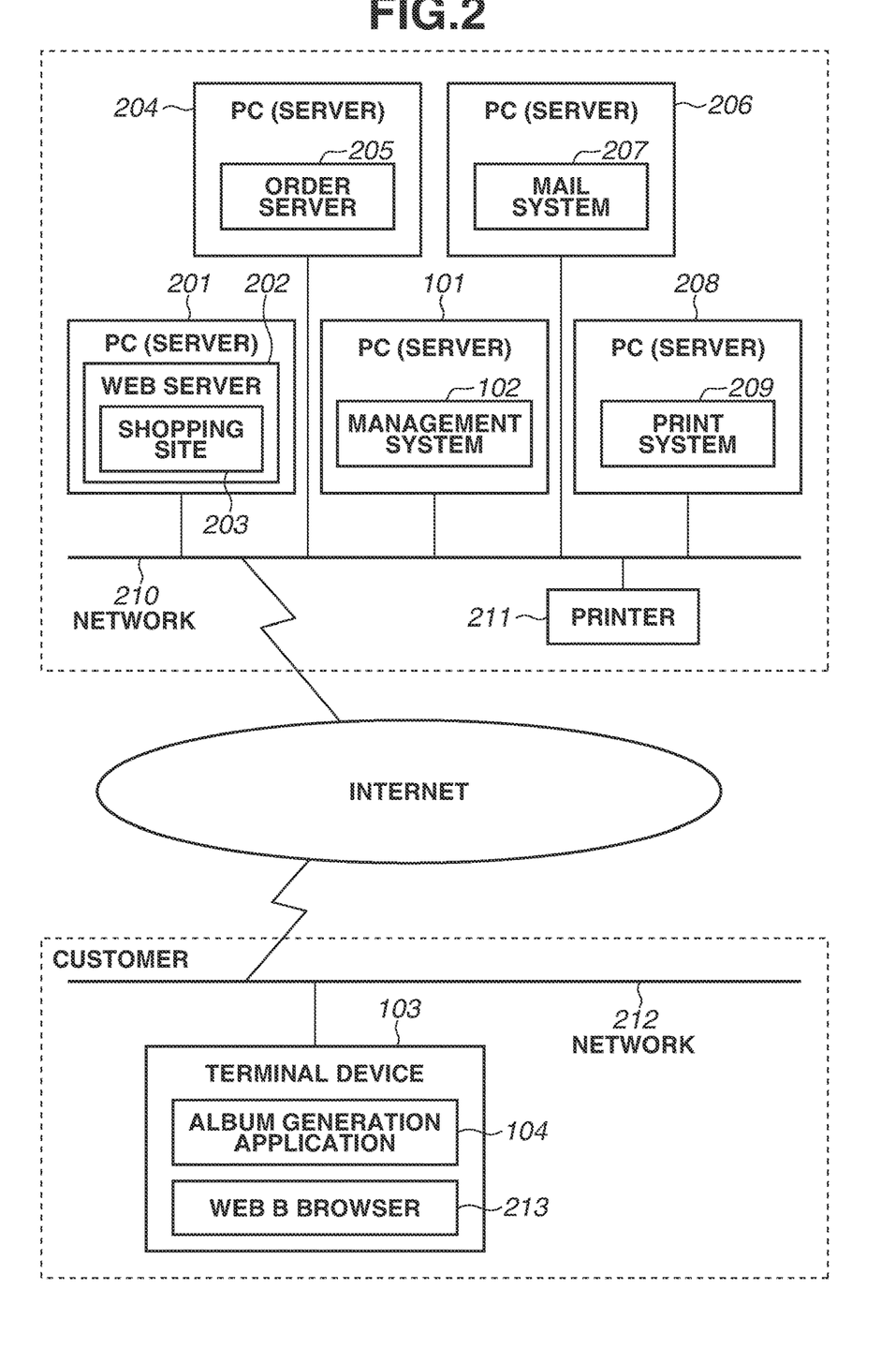
FIG. 2 illustrates an example of a configuration of an album ordering system.

FIG. 2 illustrates an outline of an album ordering system according to the present exemplary embodiment. As described above, the terminal device 103 includes the album generation application 104. The terminal device 103 can edit album data for generating an album by the album generation application 104. A system for ordering an album by the album generation application 104 is described. A network 212 to which the terminal device 103 belongs and a network 210 to which PCs 101, 201, 204, 206, and 208, and a printer 211 belong are connected to each other via the Internet. Thus, each device belonging to the network 212 and the network 210 can communicate with each other. The PCs 201, 204, 206, and 208 are information processing apparatuses including general PCs or servers as with the PC 101. Further, the printer 211 is a printing apparatus which performs printing using the ink-jet method, but other printing methods may be used without limiting the printing method to ink-jet method.

The PC 201 includes a web server 202 which can provide a website. A shopping site 203 is one of the websites provided by the web server 202, and a user can order an album corresponding to album data generated by the album generation application 104 using the shopping site 203.

The PC 204 includes an order server 205 which detects reception of an order of an album from a user.

The PC 206 includes a mail system 207 for transmitting an e-mail.

The PC 208 include a print system 209 which manages print of an ordered album.

The printer 211 prints an album ordered by a user.

First, a user edits album data for generating an album using the album generation application 104 of the terminal device 103. The terminal device 103 transmits information about an edited content of the album data to the PC 101 every time the album data is edited. Accordingly, a management system 102 of the PC 101 manages information about the album data being edited by the user.

Upon completion of editing, the user orders the album. Specifically, first, the terminal device 103 uploads the edited album data to the PC 101. Subsequently, the terminal device 103 accesses the shopping site 203 using a web browser 404 and orders the album based on the uploaded album data via the shopping site 203.

When an order of the album is received from the user via the shopping site 203, the web server 202 transmits order related information about the order to the order server 205 of the PC 204. The order related information includes a name, an address, a telephone number, and information for specifying the ordered album data.

The PC 204 which detects reception of the order by receiving the order related information transmits the order related information to the management system 102 of the PC 101. The order server 205 and the management system 102 may function on the same PC.

The PC 101 receives and temporarily stores the album data uploaded from the album generation application 104 by the management system 102 and manages the album data as order information in association with the order related information received from the PC 204. Subsequently, the PC 101 transmits the order information to the print system 209 of the PC 208.

In a case where the order information is received, the PC 208 converts the album data by the print system 209 into print data for printing the album by the printer 211. The print data includes a print ticket in which a print setting and the like are described and a portable document format (PDF) file as print image data. The PC 208 transmits the converted print data to the printer 211. The printer 211 performs printing based on the received print data and generates the album. The PC 208 manages a status of the album (waiting for printing, printed status, delivered status, and the like) based on the received order information and a delivery slip number (a tracking number) for tracking a delivery state of the delivered album. The PC 208 accordingly transmits these pieces of the information to the management system 102 of the PC 101.

The PC 101 receives the information about the status of the album and the delivery slip number from the management system 102 and updates a status of each piece of the order information which the PC 101 manages. Further, the PC 101 transmits the information about the status of the album and the delivery slip number to the shopping site 203 of the PC 201. Upon receiving the information about the status of the album and the delivery slip number, the shopping site 203 accesses the mail system 207 of the PC 206. Subsequently, the shopping site 203 causes the mail system 207 to transmit an e-mail for notifying the user of the information about the status of the album and the delivery slip number.

As described above, a user can order an album, and after the order of the album, the album generated by the printer 211 is delivered to the user.

According to the present exemplary embodiment, an example is described in which the PCs 101, 201, 204, 206, and 208, and the printer 211 are connected with each other via the network 210. However, for example, the PCs 101, 201, 204, 206, and 208, and the printer 211 may be connected with each other via the Internet without limiting to the above-described example.

According to the present exemplary embodiment, the PCs 101, 201, 204, 206, and 208 are included in a single server, but the present exemplary embodiment is not limited to this configuration. A plurality of servers may operate in cooperation with each other and construct a server system corresponding to the PCs 101, 201, 204, 206, and 208. Further, functions executed by a plurality of servers of the PCs 101, 201, 204, 206, and 208 may be executed by a single server.

<Hardware Configuration of Each Device>

Figure 3:
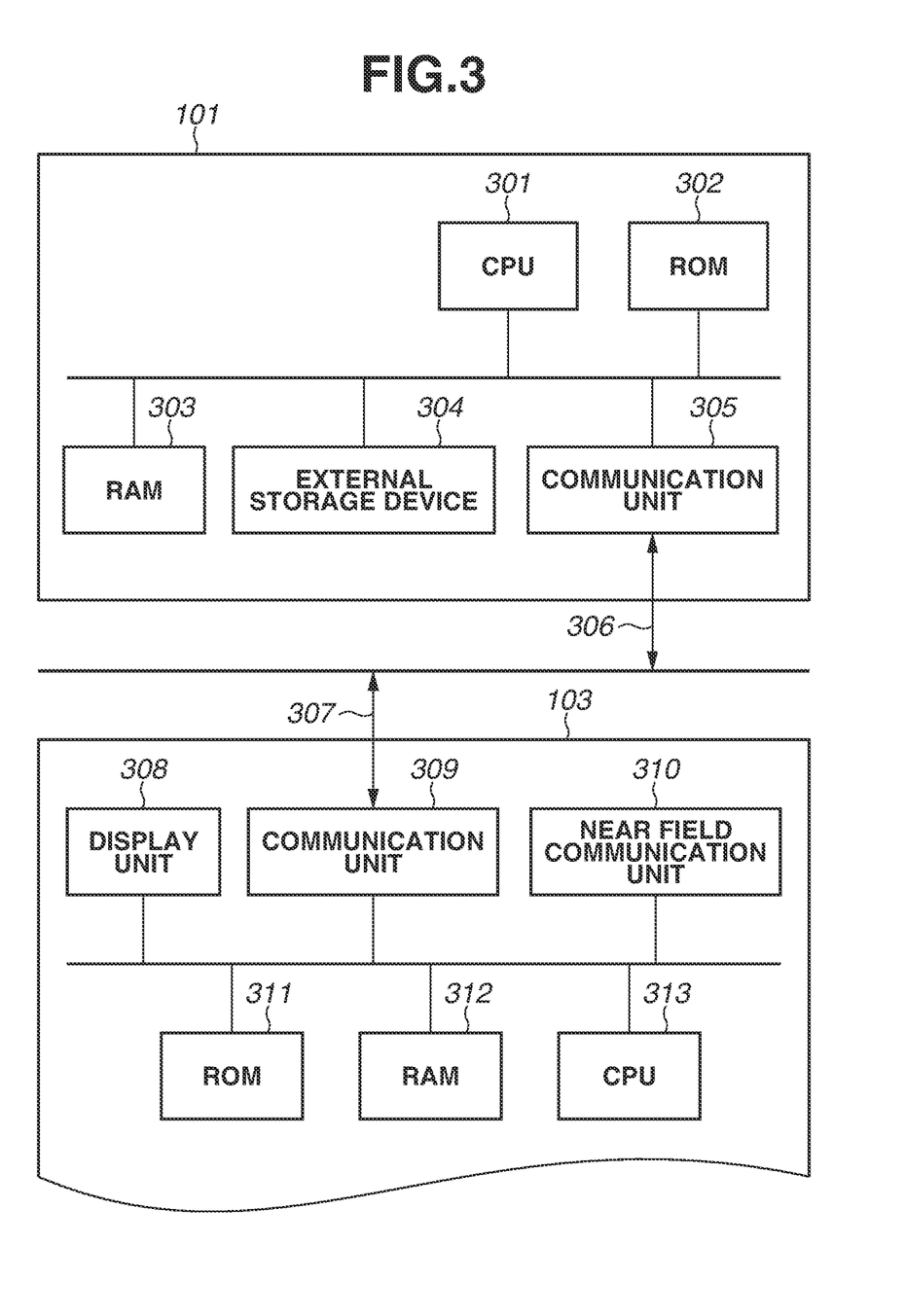
FIG. 3 illustrates an example of a hardware configuration of a terminal device and an information processing apparatus.

A hardware configuration of the PC 101 and the terminal device 103 is described with reference to a block diagram in FIG. 3.

The PC 101 includes a central processing unit (CPU) 301, a read-only memory (ROM) 302, a random access memory (RAM) 303, an external storage device 304, and a communication unit 305. Namely, a computer of the PC 101 is formed by the CPU 301, the ROM 302, and the like.

The CPU 301 is a system control unit and entirely controls the PC 101.

The ROM 302 stores fixed data such as a control program to be executed by the CPU 301, a data table, and an operation system (OS) program. According to the present exemplary embodiment, each control program stored in the ROM 302 performs software execution control such as scheduling, task switching, and interruption processing under control of a built-in OS stored in the ROM 302.

The RAM 303 includes a static random access memory (SRAM) which requires a backup power source. The RAM 303 can retain data using a primary battery for data backup, which is not illustrated, and thus can store important data such as a program control variable without volatilizing the data. Further, the RAM 303 includes a memory, area for storing setting information about the PC 101, management data of the PC 101, and the like. Furthermore, the RAM 303 is used as a main memory and a work memory of the CPU 301.

The external storage device 304 stores a program for performing push notification to the terminal device 103.

The communication unit 305 is configured to execute data communication with other devices. The communication unit 305 can communicate with another server, the terminal device 103, and the like via the Internet. The PC 101 may include a plurality of communication units in order to communicate with the other devices using respectively different communication methods.

Configurations of the PCs 201, 204, 208, and 206 are similar to that of the PC 101.

The terminal device 103 includes a display unit 308, a communication unit 309, a near field communication unit 310, a ROM 311, a RAM 312, and a CPU 313. Namely, a computer of the terminal device 103 is formed by the CPU 313, the ROM 311, and the like.

The CPU 313 is a system control unit and entirely controls the terminal device 103.

The ROM 311 stores fixed data such as a control program to be executed by the CPU 313, a data table, and an OS program, According to the present exemplary embodiment, each control program stored in the ROM 311 performs software execution control such as scheduling, task switching, and interruption processing under control of a built-in OS stored in the ROM 311. Further, the ROM 311 stores various programs such as the album generation application 104 and various types of information used by these programs.

The RAM 312 includes a SRAM which requires a backup power source. The RAM 312 can retain data using a primary battery for data backup, which is not illustrated, and thus can store important data such as a program control variable without volatilizing the data. Further, the RAM 312 includes a memory area for storing setting information about the terminal device 103, management data of the terminal device 103, and the like. Furthermore, the RAM 312 is used as a main memory and a work memory of the CPU 313.

The display unit 308 includes a light-emitting diode (LED) and a liquid crystal display (LCD). The display unit 308 displays a screen based on various types of data and the notification information. Operation portions such as numeral input keys, a mode setting key, a determination key, a cancel key, and a power source key may be arranged on the display unit 308 and input from a user may be received via the display unit 308.

The communication unit 309 is configured to execute data communication with other devices, and has a function (Wireless Fidelity (Wi-Fi®) function) of wireless local area network (WLAN) compliant with Institute of Electrical and Electronics Engineers (IEEE) 802.11 standard series. The communication unit 309 may perform peer-to-peer communication directly with a partner device using a Wi-Fi Direct® function and a software enabled access point (SoftAP) function and may communicate with the partner device via an external apparatus such as a wireless LAN router. According to the present exemplary embodiment, the communication unit 309 connects to the wireless LAN router, uses the Internet, and thus receives information from the PC 101 and other devices via the Internet. A communication method used by the communication unit 309 is not limited to a wireless communication method and may be a wired communication method such as a Universal Serial Bus (USB) and a wired LAN.

The near field communication unit 310 is a configuration for wirelessly connecting to another device in a short distance. A communication method used by the near field communication unit 310 is, for example, Bluetooth® Classic, but may be Bluetooth Low Energy® (BLE), Wi-Fi Aware®, and the like without using Bluetooth® Classic. According to the present exemplary embodiment, the communication unit 309 is the configuration which can perform communication at higher speed than the near field communication unit 310. In addition, a communicable distance of the communication unit 309 is longer than that of the near field communication unit 310.

<Software Configuration of Terminal Device 103>

Figure 4:
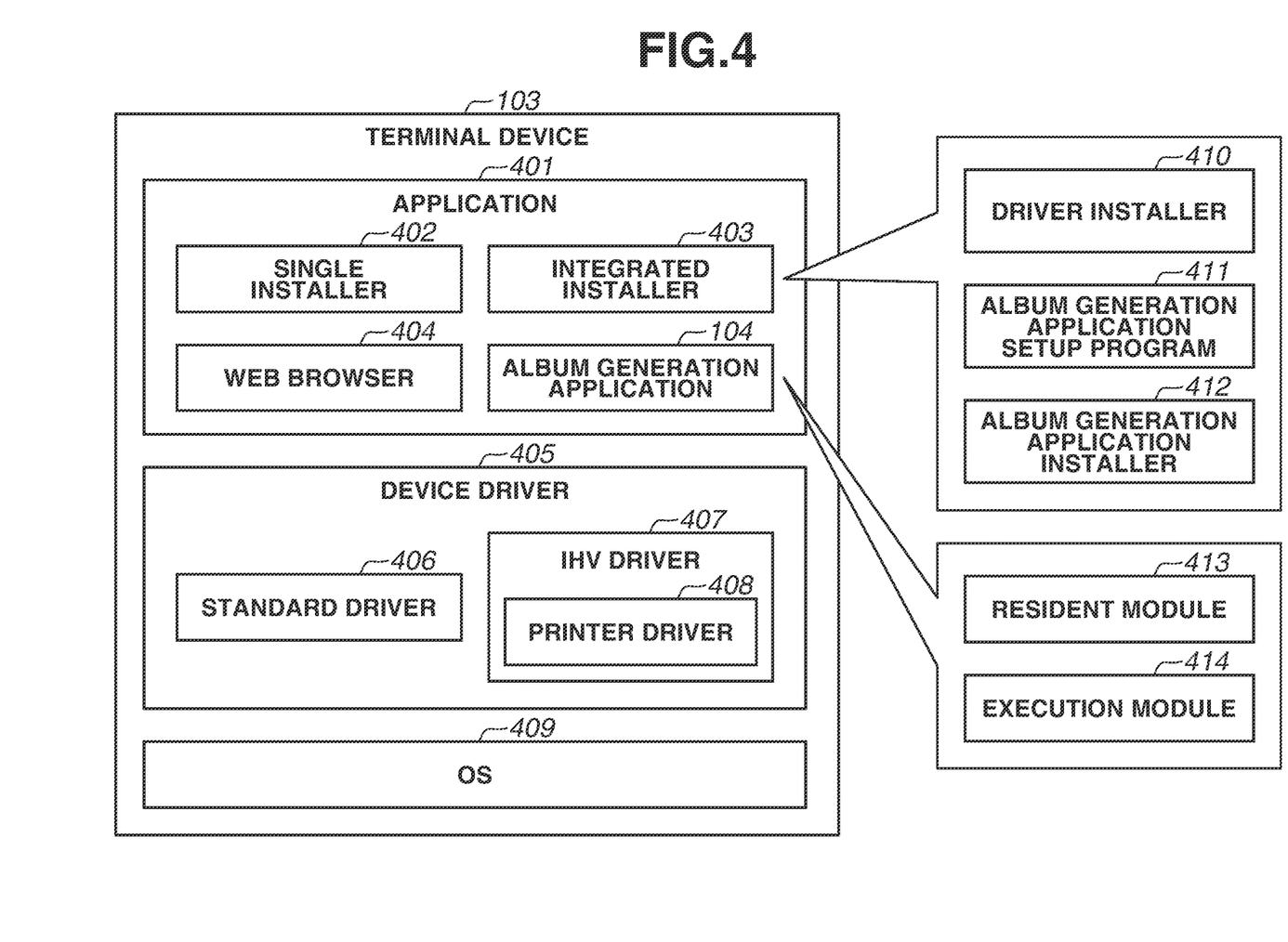
FIG. 4 illustrates an example of a software configuration of the terminal device.

A software configuration of the terminal device 103 is described with reference to a block diagram in FIG. 4. Each software is stored, for example, in the ROM 311.

An application 401 stored in the terminal device 103 can include a single installer 402, an integrated installer 403, the web browser 404, and the album generation application 104.

The single installer 402 is an installer for performing download and installation of the album generation application 104.

The integrated installer 403 is an installer for performing download and installation of a printer driver 408 described below and the album generation application 104. Therefore, the integrated installer 403 can include a driver installer 410, an album generation application setup program 411, and an album generation application installer 412. The integrated installer 403 may include a function other than the function of downloading and installing a program. According to the present exemplary embodiment, the integrated installer 403 includes a set-up function of connecting the terminal device 103 to a printer owned by a user of the terminal device 103. Subsequently, the printer driver 408 corresponding to the printer as a set-up target is downloaded and installed by the driver installer 410.

The single installer 402 and the album generation application installer 412 have the same function, and they are different in terms of whether they are included in the integrated installer 403 or not.

The web browser 404 is used when a world wide web (WWW) is used.

The album generation application 104 is an application for editing album data including a plurality of pieces of layout image data and ordering an album based on the edited album data. Further, according to the present exemplary embodiment, the album generation application 104 has an automatic layout function of automatically editing the album data based on an image input by a user and presenting the edited album data to the user. Specifically, the album generation application 104 has a function of automatically selecting a template and a function of automatically arranging an image selected by a user on the selected template and automatically generating layout age data.

The album generation application 104 can include a resident module 413 and an execution module 414. The resident module 413 controls a function of executing notification processing described below and is started based on turning on of the power source of the terminal device 103 and start-up of the terminal device 103. The execution module 414 controls the above-described automatic layout function and is started in a case where a user issues a start-up instruction of the album generation application 104. The start-up instruction of the album generation application 104 is, specifically, for example, an operation performed on an icon corresponding to the album generation application 104 on a desktop or an operation with respect to a notification area displayed by the notification processing described below.

A device driver 405 included in the terminal device 103 can include a standard driver 406 and an independent hardware vendor (IHV) driver 407.

The standard driver 406 is a driver packed as standard together with an OS 409 described below in the terminal device 103.

The IHV driver 407 is a driver provided by the HIV and is stored in the terminal device 103 by download and installation by an installer and the like from the outside of the terminal device 103. According to the present exemplary embodiment, the printer driver 408 is downloaded and installed as the URI driver 407 by the driver installer 410 included in the integrated installer 403.

The OS 409 manages each program stored in the ROM 302.

<Installation of Album Generation Application 104>

A method for installing the album generation application 104 is described. According to the present exemplary embodiment, the method includes a method using the single installer 402 and a method using the integrated installer 403.

First, the method using the single installer 402 is described. First, the terminal device 103 downloads the single installer 402 via the Internet, an installer storing compact disk (CD) mounted on the terminal device 103, and the like. Subsequently, in a case where installation of the album generation application 104 is instructed from a user via a screen to be displayed by the single installer 402, the terminal device 103 executes download and installation of the album generation application 104. At that time, another program such as the printer driver 408 is not installed together with the album generation application 104. As described above, a method for installing only one program (the album generation application 104 in this case) in response to a user operation is referred to as single installation (first installation processing) according to the present exemplary embodiment.

Figure 5:
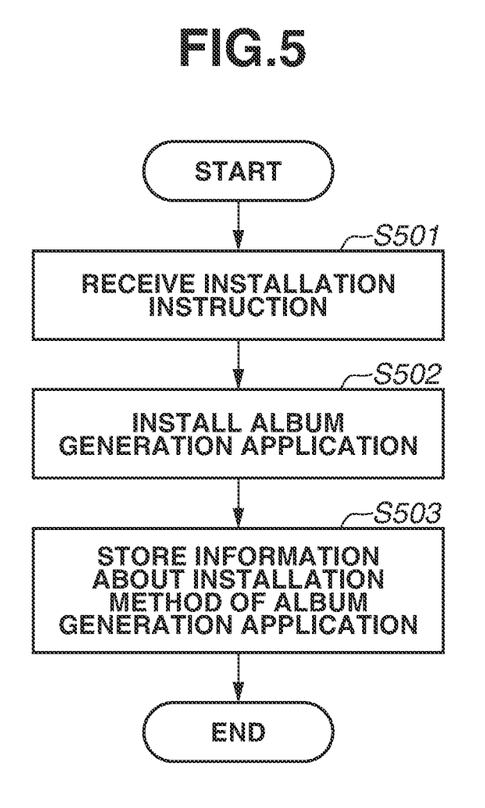
FIG. 5 is a flowchart illustrating processing for downloading and installing an album generation application by single installation.

FIG. 5 is a flowchart illustrating processing for downloading and installing the album generation application 104 by the single installation. Processing in the flowchart illustrated in FIG. 5 is realized by, for example, the CPU 313 reading the single installer 402 stored in the memory included in the terminal device 103 into the RAM 312 and executing the single installer 402. The processing in the present flowchart is started by a user instruction in a state in which the single installer 402 is started.

In step S501, the CPU 313 receives an installation instruction from a user via a screen to be displayed by the single installer 402.

In step S502, the CPU 313 downloads and installs the album generation application 104 in the terminal device 103 using the single installer 402. In this regard, in a case where the album generation application 104 is already installed in the terminal device 103, the present processing is not executed.

In step S503, the CPU 313 stores information about the installation method of the album generation application 104 in a predetermined memory area (hereinbelow, referred to as an installation method storage area) using the single installer 402. Specifically, at that time, information indicating that the album generation application 104 is stored by the single installation is stored in the installation method storage area as the information about the installation method of the album generation application 104. In this regard, in a case where the information is already stored in the installation method storage area, the present processing is not executed. Further, in a case where the album generation application 104 is uninstalled, the information stored in the installation method storage area is also deleted.

Next, the method using the integrated installer 403 is described. First, the terminal device 103 downloads the integrated installer 403 via the Internet, an installer storing CD mounted on the terminal device 103, and the like. Subsequently, the terminal device 103 receives a selection of a program to be installed based on a predetermined user instruction which is received later via a screen to be displayed by the integrated installer 403. Specifically, for example, a user can select whether to set the album generation application 104 as an installation target by input to a check box corresponding the album generation application 104. According to the present exemplary embodiment, the terminal device 103 receives input of whether to set the album generation application 104 as the installation target but does not receive input of whether to set the printer driver 40 as the installation target. In other words, in a case where the predetermined user instruction is executed, the printer driver 408 is installed without fail. This is because the integrated installer 403 is a program for setting up the printer and, it is highly likely that the user wants to install the printer driver 408 because the integrated installer 403 is installed.

Subsequently, in a case where the predetermined user instruction is executed via a screen to be displayed by the integrated installer 403, the terminal device 103 downloads and installs the program set as the installation target by the user input and the printer driver 408. As described above, a method for installing a plurality of programs (the album generation application 104 and the printer driver 408 in this case) in response to a user operation is referred to as integrated installation (second installation processing) according to the present exemplary embodiment.

Figure 6:
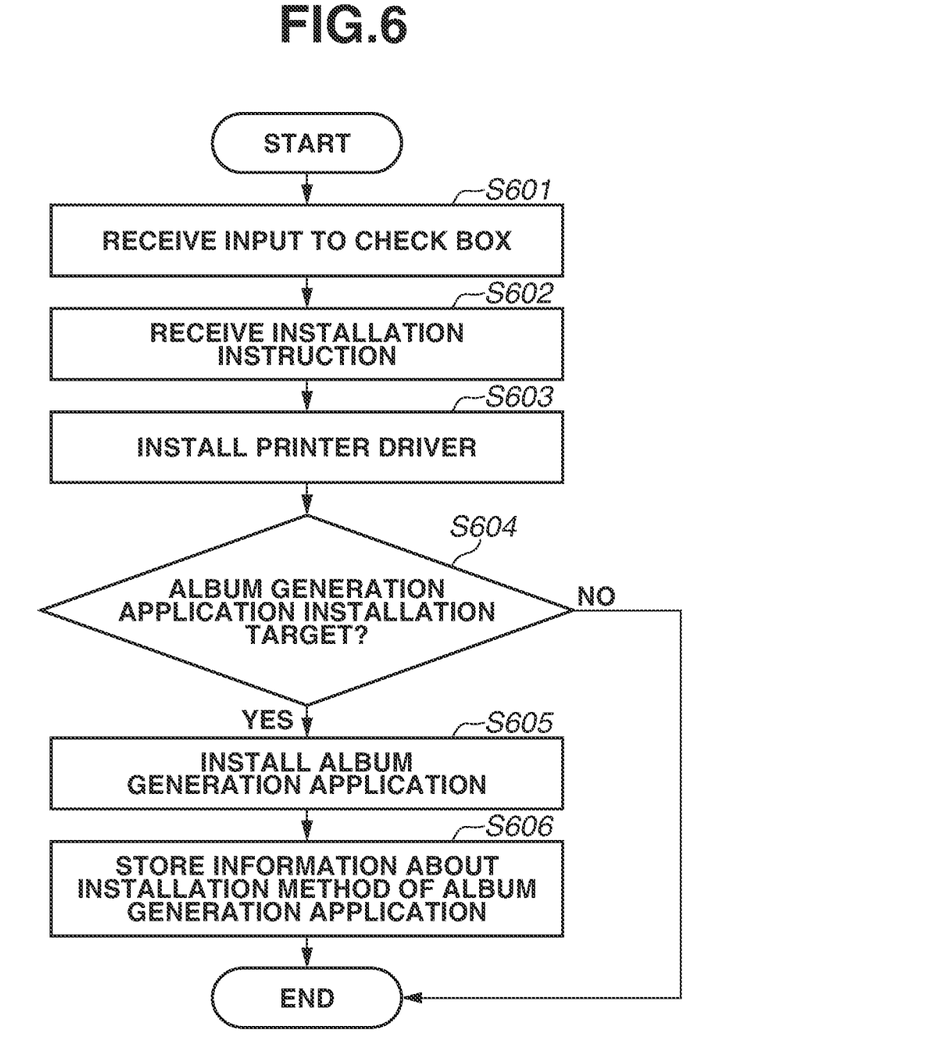
FIG. 6 is a flowchart illustrating processing for downloading and installing the album generation application by integral installation.

FIG. 6 is a flowchart illustrating processing for downloading and installing a program by the integrated installation. Processing in the flowchart illustrated in FIG. 6 is realized by, for example, the CPU 313 reading the integrated installer 403 stored in the memory included in the terminal device 103 into the RAM 312 and executing the integrated installer 403. The processing in the present flowchart is started by a user instruction in a state in which the integrated installer 403 is started.

In step S601, the CPU 313 displays a screen for receiving input of whether to set the album generation application 104 as the installation target on the display unit 308 by the integrated installer 403. According to the present exemplary embodiment, a value for setting the album generation application 104 as the installation target is input to a check box as an initial value. Thus, in a case where an installation instruction described below is performed without receiving input to the check box from a user, the album generation application 104 is set as the installation target.

In step S602, the CPU 313 receives the installation instruction from the user via a screen to be displayed by the integrated installer 403.

In step S603, the CPU 313 downloads and installs the printer driver 408 in the terminal device 103 using the driver installer 410 included in the integrated installer 403. In this regard, in a case where the printer driver 408 is already installed in the terminal device 103, the present processing is not executed.

In step S604, the CPU 313 determines whether the album generation application 104 is the installation target based on a value input to the screen displayed in step S601. In a case of YES determination (YES in step S604), the CPU 313 advances the processing to step S605, and in a case of NO determination (NO in step S604), the CPU 313 terminates the processing without downloading and installing the album generation application 104 in the terminal device 103.

In step S605, the CPU 313 starts the album generation application setup program 411 included in the integrated installer 403. Further, the CPU 313 stores the information about the installation method of the album generation application 104 in the installation method storage area using the album generation application setup program 411. Specifically, at that time, information indicating that the album generation application 104 is stored by the integrated installation is stored in the installation method storage area as the information about the installation method of the album generation application 104. In this regard, in a case where the information is already stored in the installation method storage area, the present processing is not executed.

In step S606, the CPU 313 downloads and installs the album generation application 104 in the terminal device 103 using the album generation application installer 412 included in the integrated installer 403. In this regard, in a case where the album generation application 104 is already installed in the terminal device 103, the present processing is not executed.

The integrated installer 403 has a function of installing the printer driver 408 in the terminal device 103 as a main function. Therefore, for example, in a case where a user performs the installation instruction without checking the screen in step S601 in detail, it is highly likely that the user erroneously recognizes that only the printer driver 408 is installed by the installation instruction. In other words, in a case where the album generation application 104 is installed by the integrated installation, the user does not notice that the album generation application 104 is installed in some cases.

Therefore, in a case where the album generation application 104 is installed by the integrated installation, it is desirable to issue a notification about the album generation application 104 to a user. Further, it is desirable to make a user notice (recognize) that the album generation application 104 has been installed and to prompt the user to use the album generation application 104.

On the other hand, in a case where the album generation application 104 is installed by the single installation, a user inevitably recognizes that the album generation application 104 is installed. Therefore, in a case where the album generation application 104 is installed by the single installation, notification for causing a user to notice the installation of the album generation application 104 is troublesome for the user.

Therefore, according to the present exemplary embodiment, in a case where the album generation application 104 is installed by the integrated installation, predetermined notification about the album generation application 104 is issued to a user. Further, according to the present exemplary embodiment, in a case where the album generation application 104 is installed by the single installation, the above-described notification for the integrated installation is not issued. Control according to the present exemplary embodiment is described in detail below.

Figure 7:
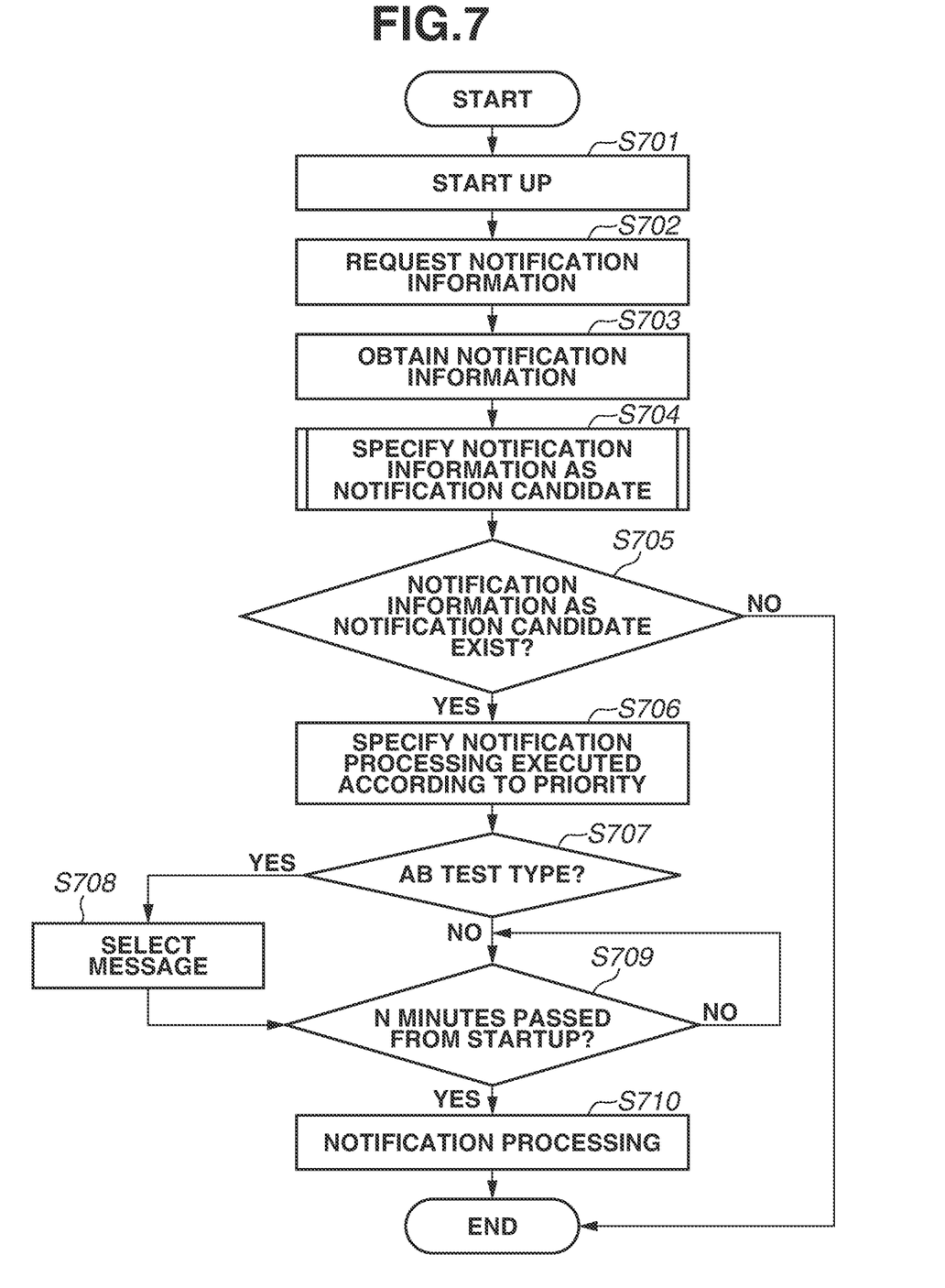
FIG. 7 is a flowchart illustrating processing executed by a resident module in the album generation application.

FIG. 7 is a flowchart illustrating processing executed by the resident module 413 in the album generation application 104 in the notification about the album generation application 104. Processing in the flowchart illustrated in FIG. 7 is realized by, for example, the CPU 313 reading the album generation application 104 stored in the memory included in the terminal device 103 into the RAM 312 and executing album generation application 104.

In step S701, the CPU 313 starts the resident module 413 based on an instruction from the OS which detects that the power source of the terminal device 103 is turned on, and the terminal device 103 is started.

In step S702, the CPU 313 transmits a request for the notification information to the management system 102 of the PC 101 via the Internet. According to the present exemplary embodiment, the management system 102 includes a plurality of pieces of the notification information about the album generation application 104 and transmits all pieces of the stored notification information to the terminal device 103 in response to reception of the request.

In step S703, the CPU 313 obtains the plurality of pieces of the notification information stored in the management system 102. The notification information stored in the management system 102 may be one piece.

In step S704, the CPU 313 specifies the notification information as a notification candidate in the pieces of the notification information obtained in step S703. The present processing is described in detail with reference to FIG. 8.

Figure 8:
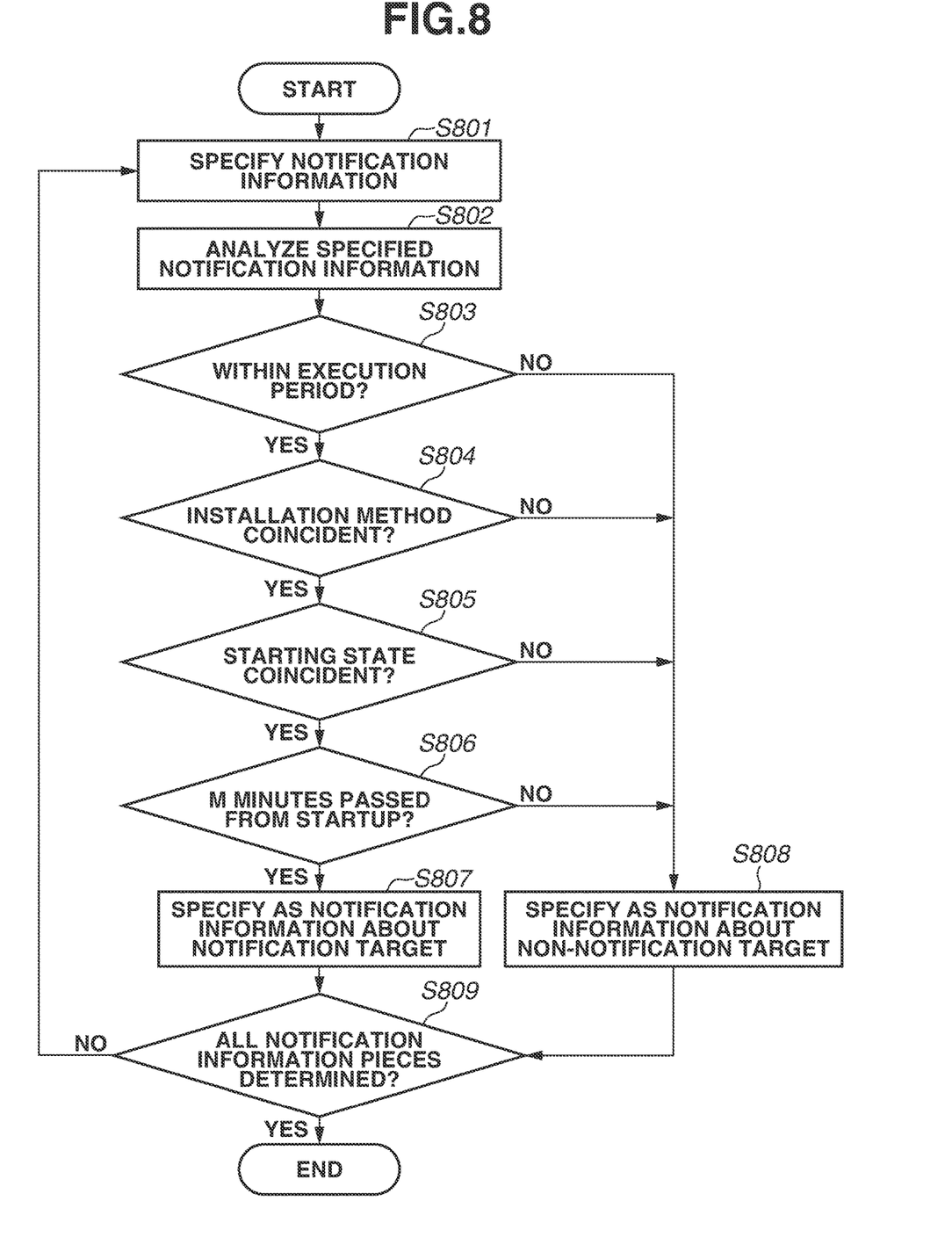
FIG. 8 is a flowchart illustrating processing for specifying notification information regarded as a notification candidate.

FIG. 8 is a flowchart illustrating processing for specifying the notification information as the notification candidate. Processing in the flowchart illustrated in FIG. 8 is realized by, for example, the CPU 313 reading the album generation application 104 stored in the memory included in the terminal device 103 into the RAM 312 and executing album generation application 104.

In step S801, the CPU 313 specifies the notification information as a target in determination processing in a later stage in the plurality of pieces of the notification information obtained in step S703. Naturally, the notification information already handled as the target in the determination processing is not specified.

Figure 9A:
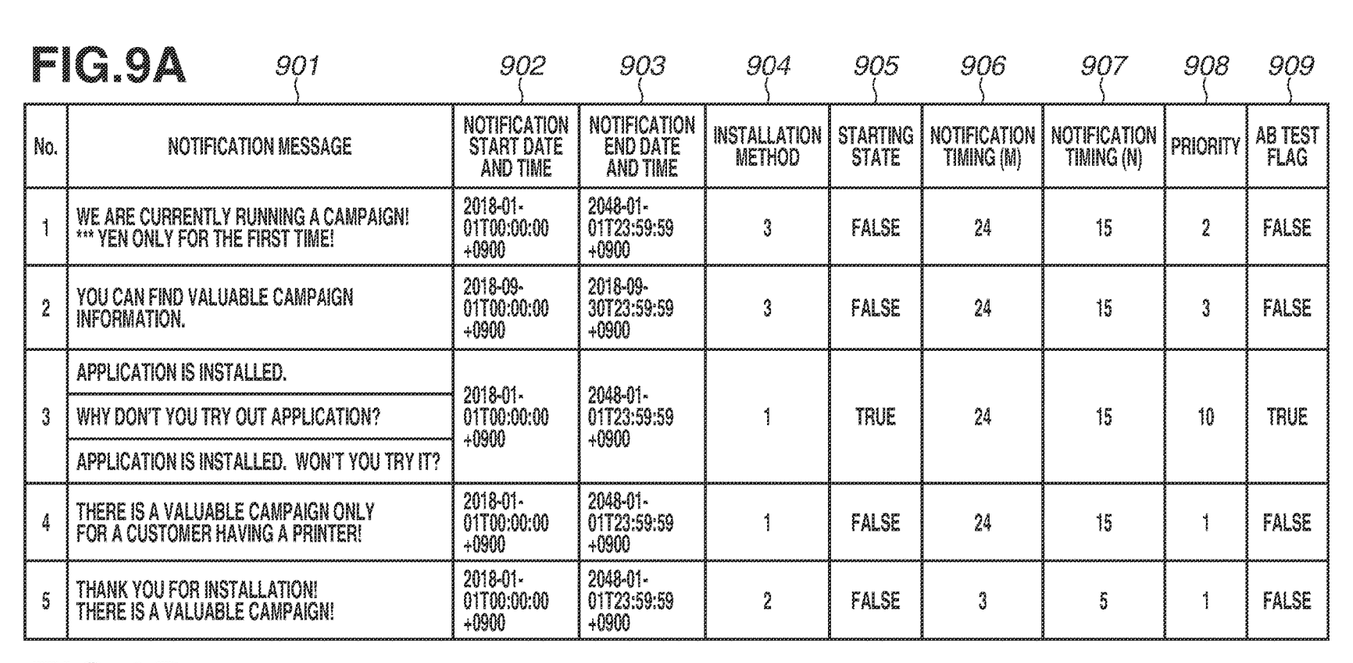
FIGS. 9A and 9B illustrate examples of setting values set to the notification information.

In step S802, the CPU 313 analyzes the notification information specified in step S801 and specifies each setting value set in the notification information specified in step S801. FIG. 9A illustrates a setting value of each of the plurality of pieces of the notification information obtained in step S703. In step S802, the CPU 313 specifies each setting value corresponding to a number (No.) of the notification information specified in step S801 in the setting values in FIG. 9A.

According to the present exemplary embodiment, there are the notification information about the notification processing within an execution period and the notification information about the notification processing out of the execution period. The notification processing out of the execution period is the notification processing of which the execution period has already passed or the notification processing of which the execution period will come in the future. Therefore, in step S803, the CPU 313 determines whether the execution period of the notification processing based on the notification information specified in step S801 includes current date and time. The execution period of the notification processing based on the notification information specified in step S801 is specified from a value in notification start date and time 902 and a value in notification end date and time 903 specified by the analysis in step S802. In a case of YES determination (YES in step S803), the CPU 313 advances the processing to step S804, and in a case of NO determination (NO in step S803), the CPU 313 advances the processing to step S808.

According to the present exemplary embodiment, there are the notification information corresponding to the integrated installation, the notification information corresponding to the single installation, and the notification information corresponding to both of the installation methods. The notification information corresponding to the integrated installation is the notification information about the notification processing to be executed in a state in which the album generation application 104 is installed by the integrated installation. Further, the notification information corresponding to the single installation is the notification information about the notification processing to be executed in a state in which the album generation application 104 is installed by the single installation. Furthermore, the notification information corresponding to both of the installation methods is the notification information about the notification processing to be executed regardless of the installation method. Therefore, in step S804, the CPU 313 determines whether the installation method corresponding to the notification information specified in step S801 coincides with the installation method used for the installation of the album generation application 104 in the terminal device 103. The installation method corresponding to the notification information specified in step S801 is specified from a value in an installation method 904 specified by the analysis in step S802. The values 1, 2, and 3 in the installation method 904 respectively correspond to the integrated installation, the single installation, and both of the installation methods. Further, the installation method used for the installation of the album generation application 104 in the terminal device 103 is specified based on information stored in the installation method storage area. In a case of YES determination (YES in step S804), the CPU 313 advances the processing to step S805, and in a case of NO determination (NO in step S804), the CPU 313 advances the processing to step S808.

According to the present exemplary embodiment, there is the notification information corresponding to a started state where the execution module 414 has been started after the installation of the album generation application 104. In addition, there is the notification information corresponding to a non-start state where the execution module 414 has not been started after the installation of the album generation application 104. The notification information corresponding to the started state is the notification information about the notification processing to be executed in the started state, and the notification information corresponding to the non-start state is the notification information about the notification processing to be executed in the non-start state. Therefore, in step S805, the CPU 313 determines whether a starting state corresponding to the notification information specified in step S704 coincides with a starting state of the execution module 414. The starting state corresponding to the notification information specified in step S704 is specified from a value in a starting state 905 specified by the analysis in step S802. The values False and True in the starting state 905 respectively correspond to the started state and the non-start state. A value corresponding to both of the started state and the non-start state may be included in the starting state 905. In a case of YES determination (YES in step S805), the CPU 313 advances the processing to step S806, and in a case of NO determination (NO in step S805), the CPU 313 advances the processing to step S808.

According to the present exemplary embodiment, control is performed so that the notification processing is executed after at least a predetermined time has passed from the installation of the album generation application 104. This is because it is highly likely that the user performs an operation regarding the printer set up using the integrated installer 403 especially immediately after the album generation application 104 is installed by the integrated installation. Specifically, for example, there are the notification processing to be executed after at least three hours or more have passed from the installation of the album generation application 104 and the notification processing to be executed after at least 24 hours or more have passed from the installation of the album generation application 104. Therefore, in step S806, the CPU 313 determines whether M hours or more have passed from the installation of the album generation application 104. A threshold value M is a value set to each of the notification information, which is the value regarding a timing at which the notification processing to be executed based on the notification information can be executed and is specified from a value in a notification timing (M) 906 specified by the analysis in step S802. The threshold value M may be constant regardless of a content of the notification information. In a case of YES determination (YES in step S806), the CPU 313 advances the processing to step S807, and in a case of NO determination (NC) in step S806), the CPU 313 advances the processing to step S808.

In step S807, the CPU 313 specifies the notification information specified in step S801 as the notification information which is the notification candidate.

On the other hand, in step S808, the CPU 313 specifies the notification information specified in step S801 as the notification information which is not the notification candidate.

In step S809, the CPU 313 determines whether all pieces of the notification information obtained in step S703 are specified in step S801 (whether determination processing is executed with respect to all pieces of the notification information obtained in step S703). In a case of YES determination (YES in step S809), the CPU 313 terminates the processing in the present flowchart and advances the processing to step S705, and in a case of NO determination (NO in step S809), the CPU 313 returns the processing to step S801.

In step S705, the CPU 313 determines whether there is the notification information specified as the notification candidate in step S704. In a case of YES determination (YES in step S705), the CPU 313 advances the processing to step S706, and in a case of NO determination (NO in step S705), the CPU 313 terminates the processing without executing the notification processing.

In step S706, the CPU 313 specifies the notification information to be actually set as a notification target in the notification information specified as the notification candidates in step S704 based on priority. Specifically, the CPU 313 specifies the notification information having a smallest value in priority 908 specified by the analysis in step S802 as the notification target. In a case where there is a plurality of pieces of the notification information having the smallest value in the priority 908, any of the notification information may be selected therefrom and specified as the notification target, and the plurality of pieces of the notification information may be specified as the notification targets.

In step S707, the CPU 313 determines whether the notification information specified as the notification target in step S706 is the notification information for executing the notification processing in an AB test type. In the notification processing in the AB test type, any message is selected at random from a plurality of messages corresponding to the notification information specified as the notification target in step S706 and notified. Subsequently, in a case where a user operation is performed on the selected message, the management system 102 of the PC 101 is notified of the selected message. The notification processing in the AB test type is executed as described above, and thus the management system 102 can understand which message more attracts the interest of a user. The present determination is executed based on a value in an AB test flag 909 specified by the analysis in step S802. In a case of YES determination (YES in step S707), the CPU 313 advances the processing to step S708, and in a case of NO determination (NO in step S707), the CPU 313 advances the processing to step S709.

In step S708, the CPU 313 selects any message at random from the plurality of messages corresponding to the notification information specified as the notification target in step S706. The message selected in step S708 is displayed in the notification processing described below.

According to the present exemplary embodiment, control is performed so that the notification processing is executed after at least a specific time has passed from start-up of the terminal device 103 (turning on of the power source of the terminal device 103). This is because it is highly likely that a user performs an operation which the user desires, such as checking of an e-mail immediately after the start-up of the terminal device 103 and feels the notification about the album generation application 104 to be troublesome, According to the present exemplary embodiment, there are, for example, the notification processing to be executed after at least five minutes or more have passed from the start-up of the terminal device 103 and the notification processing to be executed after at least 30 minutes or more have passed from the start-up of the terminal device 103. Therefore, in step S709, the CPU 313 determines whether N minutes have passed from the start-up of the terminal device 103. A threshold value N is a value set to the notification information specified as the notification target in step S706 which is the value regarding a timing at which the notification processing to be executed based on the notification information specified as the notification target in step S706 can be executed. The threshold value N is specified from a value in a notification timing (N) 907 specified by the analysis in step S802. The threshold value N may be constant regardless of the content of the notification information. In a case of YES determination (YES in step S709), the CPU 313 advances the processing to step S710, and in a case of NO determination (NO in step S709), the CPU 313 repeats the processing in step S709 until N minutes elapse.

In step S710, the CPU 313 executes the notification processing based on the notification information specified as the notification target in step S706. Specifically, the CPU 313 instructs the OS to perform pop-up display of the notification area for performing the notification about the album generation application 104 in a part of a screen to be displayed by the display unit 308. Accordingly, the pop-up display of the notification area is performed in the part of the screen displayed by the display unit 308.

Figure 10:
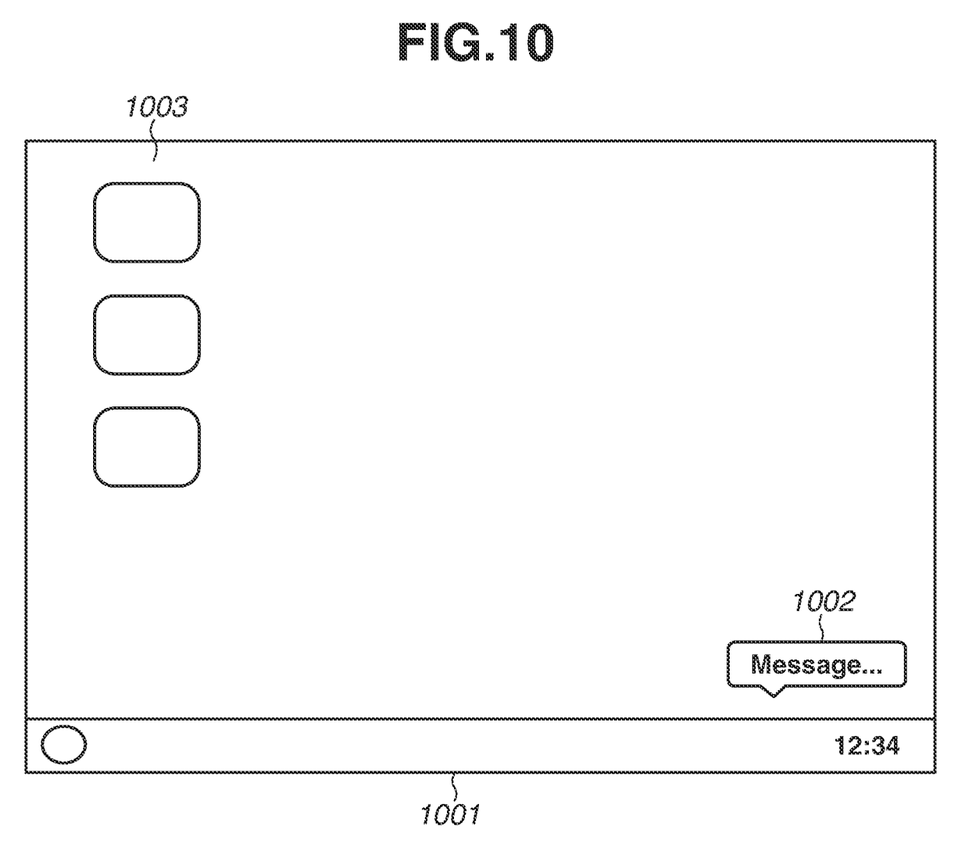
FIG. 10 illustrates an example of a screen in which a notification area is displayed.

FIG. 10 illustrates an example of a screen to be displayed by the display unit 308 in a state where the notification area is popped up therein. An area 1001 represents an entire screen to be displayed by the display unit 308. A desktop is displayed in this example. Therefore, icons 1003 corresponding to programs installed in the terminal device 103 are included in the area 1001. Pop-up display of a notification area 1002 is performed in the area 1001. A position at which the notification area 1002 is displayed is not limited and is determined, for example, by the OS controlling a pop-up notification function.

A message included in the pop-up display of the notification area 1002 is a value in a notification message 901 set to the notification information specified as the notification target in step S706. The notification message 901 is, for example, a message for notifying a user of installation of the album generation application 104 in the terminal device 103 and a message for prompting a user to use the album generation application 104. Further, the notification message 901 is, for example, a message regarding a campaign of an album which can be ordered using the album generation application 104. In a case where a user operates the notification area displayed at that time, the CPU 313 may start the execution module 414 and provide the user with an album data generation function included in the album generation application 104.

Figure 9B:
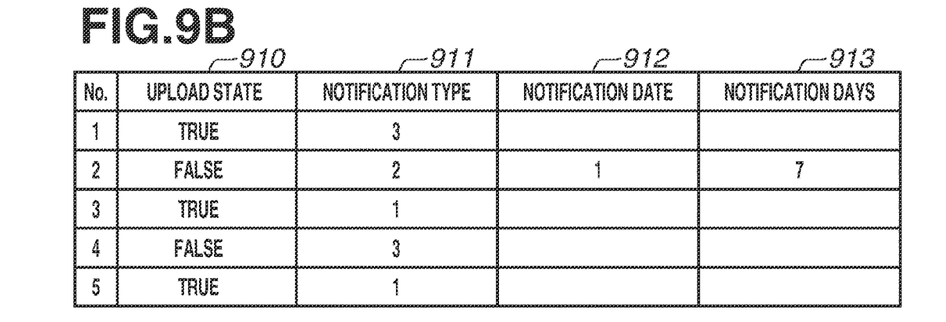

In the above description, whether to execute notification based on the notification information is specified based on the setting values from the notification start date and time 902 to the priority 908. However, whether to execute notification based on the notification information may be specified based on other setting values. FIG. 9B illustrates setting values other than the above-described setting values of the plurality of pieces of the notification information obtained in step S703. As described above, according to the present exemplary embodiment, a user can order an album using the album generation application 104. Further, when ordering the album, the user uploads album data (layout data) generated by the album generation application 104 to the management system 102 of the PC 101. The CPU 313 may change and determine whether or not to execute notification based on the notification information based on whether the album data has been uploaded by the album generation application 104. More specifically, the CPU 313 determines whether an upload state corresponding to the notification information specified in step S704 coincides with an upload state of the album generation application 104. For example, a value "False" in an upload state 910 corresponds to a state in which the album data has not been uploaded, and a value "True" corresponds to a state in which the album data has been uploaded. There may be a value corresponding to the both states.

Further, for example, a period for executing notification based on the notification information may be defined more strictly. For example, there may be notification information of a type (Type 1) corresponding to notification executed at a timing when the terminal device 103 is started for the first time after the installation of the album generation application 104. Further, there may be notification information of a type (Type 2) corresponding to notification executed at a timing when the terminal device 103 is started for the first time in a predetermined period which comes every month. Furthermore, there may be notification information of a type (Type 3) corresponding to notification executed at a timing when the terminal device 103 is started for the first time after the notification information is added to the management system 102. A notification type 911 is an item indicating which one of the above-described types the notification information belongs to. Further, items in notification date 912 and notification days 913 are defined in the Type 2 notification information. A value of the notification date 912 indicates a starting date of the predetermined period which comes every month. A value of the notification days 913 indicates number of days of the predetermined period which comes every month. In other words, in a case illustrated in FIG. 9B, notification based on the notification information No. 2 is executed at a timing when the terminal device 103 is started for the first time in a period from first to eighth day of every month.

As described above, according to the present exemplary embodiment, in a case where it is likely that a user has not recognized installation of the album generation application 104 since the album generation application 104 is installed by the integrated installation, the notification processing for the integrated installation can be executed. Accordingly, the present exemplary embodiment can make a user recognize the installation of the album generation application 104 and prompt the user to use the album generation application 104.

Further, in a case where the album generation application 104 has been installed by the single installation, and a user recognizes that the album generation application 104 has been installed, the notification processing for the integrated installation may be troublesome for the user. Thus, according to the present exemplary embodiment, the notification processing for the integrated installation is not executed in a case where the album generation application 104 is installed by the single installation. Accordingly, a user can be prevented from feeling troublesome, and user convenience can be improved.

Further, in a case where the album generation application 104 is installed by the single installation, notification for making the user recognize the installation of the album generation application 104 is not executed, but notification of campaign information and the like is executed. As described above, user convenience can be improved by executing notification which is desirable for a user according to the installation method of the album generation application 104.

Other Embodiments

According to the above-described exemplary embodiments, the management system 102 of the PC 101 stores the notification information, and the resident module 413 obtains the notification information. However, the exemplary embodiment is not limited to this configuration. For example, the resident module 413 may store the notification information in advance without obtaining the notification information from the outside and specify the notification information as the notification target from the notification information stored in advance.

According to the above-described exemplary embodiments, the resident module 413 specifies the notification information as the notification target. However, the exemplary embodiment is not limited to this configuration. For example, a program other than the album generation application 104 installed in the terminal device 103 may specify the notification information as the notification target. Further, for example, an apparatus other than the terminal device 103 (for example, the PC 101) may specify the notification information as the notification target. In a case where the PC 101 specifies the notification information as the notification target, the PC 101 first obtains information necessary for specifying the notification information as the notification target from the terminal device 103. Then, the PC 101 specifies the notification information as the notification target based on the obtained information and transmits only the specified notification information as the notification target in response to a request received from the terminal device 103. The terminal device 103 executes the notification processing based on the received notification information without executing processing for selecting the notification information as the notification target from the received notification information. In addition, in this configuration, the notification about the album generation application 104 may be performed, for example, not in pop-up display but by an e-mail.

According to the above-described exemplary embodiments, the configuration is described in which an application which is installed by the single installation and the integrated installation and executes the notification processing is the album generation application. However, any program may be adopted without limiting to this configuration.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-171480, filed Sep. 13, 2018, which is hereby incorporated by reference herein in its entirety.

What is claimed is:

1. A method for controlling a terminal device which executes first installation processing for installing a first program but not installing a second program in response to a first installation instruction received from a user and executes second installation processing for installing the first program and the second program in response to a second installation instruction received from the user, the method comprising:

specifying whether the first program is installed in the terminal device by the first installation processing or by the second installation processing; and not executing predetermined notification regarding the first program based on specifying that the first program is installed in the terminal device by the first installation processing and executing the predetermined notification based on specifying that the first program is installed in the terminal device by the second installation processing.

2. The method according to claim 1, wherein, in a case where the first program is installed in the terminal device by the second installation processing, the predetermined notification is executed after at least a predetermined time has elapsed from start-up of the terminal device.

3. The method according to claim 1, wherein, in a case where the first program is installed in the terminal device by the second installation processing, the predetermined notification is executed after at least a specific time has elapsed from installation of the first program in the terminal device.

4. The method according to claim 1, wherein the predetermined notification is not executed in a case where a predetermined module included in the first program has been started up based on a user instruction even if the first program is installed in the terminal device by the second installation processing.

5. The method according to claim 1, further comprising obtaining notification information from an apparatus outside of the terminal device, wherein the predetermined notification is executed based on the obtained notification information.

6. The method according to claim 5,
wherein a plurality of pieces of the notification information is obtained from the apparatus outside of the terminal device,
wherein at least one piece of the notification information is specified among the obtained plurality of pieces of the notification information, and
wherein the predetermined notification is executed based on the at least one specified piece of the notification information.

7. The method according to claim 6,
wherein the obtained plurality of pieces of the notification information includes the notification information corresponding to the first installation processing and the notification information corresponding to the second installation processing, and
wherein, in a case where the first program is installed in the terminal device by the first installation processing, notification based on the notification information corresponding to the first installation processing is executed, and notification based on the notification information corresponding to the second installation processing is not executed.

8. The method according to claim 1,
wherein, in a case where the first program is installed in the terminal device by the first installation processing, the predetermined notification is not executed, but specific notification different from the predetermined notification and regarding the first program is executed, and
wherein, in a case where the first program is installed in the terminal device by the second installation processing, both of the predetermined notification and the specific notification are executed.

9. The method according to claim 1,
wherein the predetermined notification includes at least one of notification for prompting a user to use the first program and notification for indicating to a user that the first program is installed in the terminal device, and
wherein the specific notification includes notification for indicating to a user information regarding a campaign of a service provided by the first program.

10. The method according to claim 1,
wherein the first installation instruction is received via a screen to be displayed by a first installer for installing the first program, and
wherein the second installation instruction is received via a screen to be displayed by a second installer for installing the first program and the second program.

11. The method according to claim 10,
wherein input regarding whether to install the first program is received via the screen to be displayed by the second installer,
wherein, in a case where input for installing the first program is performed, and the second installation instruction is received via the screen to be displayed by the second installer, the second installation processing is executed, and
wherein, in a case where input for not installing the first program is performed, and the second installation instruction is received, via the screen to be displayed by the second installer, third installation processing for installing the second program but not installing the first program is executed.

12. The method according to claim 1, wherein the first program is a program for generating layout data representing a layout image in which an image is arranged in a template.

13. The method according to claim 12, wherein the first program generates album data for generating an album including a plurality of the layout images.

14. The method according to claim 12, wherein, in a case where the layout data is uploaded to a predetermined server outside of the terminal device, the predetermined notification is not executed if the first program is installed in the terminal device by the second installation processing.

15. The method according to claim 1, wherein the second program is a printer driver.

16. The method according to claim 1, wherein the predetermined notification is processing for displaying a predetermined notification area regarding the first program in a display unit.

17. The method according to claim 1,
wherein any message in a plurality of messages is displayed in the predetermined notification area, and
wherein, in a case where a user operation is performed on the predetermined notification area, information about a message included in the predetermined notification area on which the user operation is performed, among the plurality of messages, is notified to a server outside of the terminal device.

18. The method according to claim 1, wherein the predetermined notification includes at least one of notification for prompting a user to use the first program and notification for indicating to the user that the first program is installed in the terminal device.

19. A method for controlling a terminal device which executes first installation processing for installing a first program but not installing a second program, in response to a first installation instruction received from a user and executes second installation processing for installing the first program and the second program in response to a second installation instruction received from the user, the method comprising:
obtaining notification information from an apparatus outside of the terminal device; and
not executing, based on a fact that the first program is installed in the terminal device by the first installation processing, predetermined notification regarding the first program and based on the notification information and executing, based on a fact that the first program is installed in the terminal device by the second installation processing, the predetermined notification.

20. A storage medium storing a program causing a computer of a terminal device which executes first installation processing for installing a first program but not installing a second program in response to a first installation instruction received from a user and executes second installation processing for installing the first program and the second program in response to a second installation instruction received from the user to execute:
specifying whether the first program is installed in the terminal device by the first installation processing or by the second installation processing; and
not executing predetermined notification regarding the first program based on specifying that the first program is installed in the terminal device by the first installation processing and executing the predetermined notification based on specifying that the first program is installed in the terminal device by the second installation processing.

* * * * *